US012524267B2

(12) United States Patent
Lee et al.

(10) Patent No.: US 12,524,267 B2
(45) Date of Patent: Jan. 13, 2026

(54) APPARATUS AND METHOD WITH SCHEDULING

(71) Applicants: Samsung Electronics Co., Ltd., Suwon-si (KR); Seoul National University R&DB Foundation, Seoul (KR)

(72) Inventors: Jae Wook Lee, Seoul (KR); Younghwan Oh, Yongin-si (KR); Yunho Jin, Seoul (KR); Tae Jun Ham, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 674 days.

(21) Appl. No.: 17/887,968

(22) Filed: Aug. 15, 2022

(65) Prior Publication Data

US 2023/0143270 A1    May 11, 2023

(30) Foreign Application Priority Data

Nov. 11, 2021  (KR) .................. 10-2021-0154784

(51) Int. Cl.
*G06F 9/48* (2006.01)
*G06F 3/06* (2006.01)
(Continued)

(52) U.S. Cl.
CPC .............. *G06F 9/4887* (2013.01); *G06F 9/06* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4887; G06F 9/50; G06F 9/5005; G06N 3/04; G06N 3/063
See application file for complete search history.

(56) References Cited

U.S. PATENT DOCUMENTS 10,614,357 B2    4/2020  Lie et al.
2016/0364267 A1*  12/2016  Varadarajan .......... G06F 9/4881
(Continued)

FOREIGN PATENT DOCUMENTS

CN        113760531 A    12/2021

OTHER PUBLICATIONS

Chye et al., "QoS-Aware Cross-Layer Scheduling for Cognitive Radio Networks with Heterogeneous Data Traffic", 2013 Australiasian Telecommunication Networks and Application Conference (ATNAC), pp. 213-218 (Year: 2013).*

(Continued)

*Primary Examiner* — Charles M Swift
(74) *Attorney, Agent, or Firm* — NSIP Law

(57) ABSTRACT

A processor-implemented method with scheduling includes: receiving one or more execution requests for a plurality of models executed independently of each other in an accelerator; predicting, for each of the plurality of models, quality of service (QoS) information corresponding to the model; and scheduling the plurality of models in units of layers of the plurality of models based on, for each of the plurality of models, either one or both of the QoS information and an idle time occurring in response to a candidate layer to be scheduled in the model being executed in the accelerator.

22 Claims, 10 Drawing Sheets

(51) Int. Cl.
*G06F 9/06* (2006.01)
*G06F 9/50* (2006.01)
*G06N 3/04* (2023.01)
*G06N 3/063* (2023.01)

(52) U.S. Cl.
CPC .......... *G06F 9/4843* (2013.01); *G06F 9/4881* (2013.01); *G06F 9/50* (2013.01); *G06F 9/5005* (2013.01); *G06N 3/04* (2013.01); *G06N 3/063* (2013.01)

(56) References Cited

U.S. PATENT DOCUMENTS

| | | | |
|---|---|---|---|
| 2019/0243654 A1* | 8/2019 | Mirhosseininiri | G06F 9/3877 |
| 2020/0241511 A1* | 7/2020 | Zheng | G06N 3/08 |
| 2023/0099950 A1* | 3/2023 | Porter | G06F 9/4893 |
| | | | 718/104 |

OTHER PUBLICATIONS

Oh, et al. "Layerweaver: Maximizing resource utilization of neural processing units via layer-wise scheduling." *2021 IEEE International Symposium on High-Performance Computer Architecture (HPCA)*. IEEE, 2021. pp. 584-597.

* cited by examiner

APPARATUS AND METHOD WITH SCHEDULING

CROSS-REFERENCE TO RELATED APPLICATIONS

This application claims the benefit under 35 USC § 119(a) of Korean Patent Application No. 10-2021-0154784, filed on Nov. 11, 2021 in the Korean Intellectual Property Office, the entire disclosure of which is incorporated herein by reference for all purposes.

BACKGROUND

1. Field

The following description relates to an apparatus and method with scheduling.

2. Description of Related Art

Proprietary hardware may be used to implement artificial intelligence (AI) technology. Artificial intelligence may include, for example, performing an inference and learning through specific operations. Dedicated hardware may be used for implementing and executing such artificial intelligence.

Dedicated hardware for artificial intelligence may be implemented by, for example, a central processing unit (CPU), a graphics processing unit (GPU), or the like, and may also be implemented by a reusable field programmable gate array (FPGA), an application specific integrated circuit (ASIC), or the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with scheduling includes: receiving one or more execution requests for a plurality of models executed independently of each other in an accelerator; predicting, for each of the plurality of models, quality of service (QoS) information corresponding to the model; and scheduling the plurality of models in units of layers of the plurality of models based on, for each of the plurality of models, either one or both of the QoS information and an idle time occurring in response to a candidate layer to be scheduled in the model being executed in the accelerator.

The scheduling may include: exploring a first layer of which the idle time is minimum in a state of the accelerator among candidate layers of the plurality of models; and determining whether the first layer is scheduled based on the QoS information corresponding to each of the plurality of models.

The predicting of the QoS information may include: predicting a QoS slack time corresponding to the model; and predicting a standalone execution time corresponding to the model.

The determining of whether the first layer is scheduled may include: determining whether the plurality of models may include a model of which a QoS slack time is less than or equal to a standalone execution time; and scheduling the first layer in response to determining that the plurality of models does not comprise the model of which the QoS slack time is less than or equal to the standalone execution time.

The scheduling may include: determining whether the plurality of models may include a model of which a QoS slack time is less than or equal to a standalone execution time; and scheduling, in response to determining that the plurality of models may include the model of which the QoS slack time is less than or equal to the standalone execution time, a second layer of the model.

The scheduling may include: exploring a predetermined number of layers in an ascending order of the idle time in a state of the accelerator among candidate layers of the plurality of models; and comparing differences in idle time between the layers.

The scheduling may include scheduling, in response to the difference in idle time being greater than a threshold, a first layer of which the idle time is minimum.

The scheduling may include scheduling, in response to the difference in idle time being less than or equal to a threshold, a layer having a smallest QoS slack time among the layers.

The state of the accelerator may include any one or any combination of any two or more of: usage information of a memory included in the accelerator; a difference between a point in time that a computational resource of the accelerator is last used and a point in time that a memory access resource starts to be used; and a proceeding state of each of the plurality of models.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with scheduling includes: one or more processors configured to: receive one or more execution requests for a plurality of models executed independently of each other in an accelerator; predict, for each of the plurality of models, quality of service (QoS) information corresponding to the model; and schedule the plurality of models in units of layers of the plurality of models based on, for each of the plurality of models, either one or both of the QoS information and an idle time occurring in response to a candidate layer to be scheduled in the model being executed in the accelerator.

For the scheduling, the one or more processors may be configured to: explore a first layer of which the idle time is minimum in a state of the accelerator among candidate layers of the plurality of models; and determine whether the first layer is scheduled based on the QoS information corresponding to each of the plurality of models.

For the predicting of the QoS information, the one or more processors may be configured to: predict a QoS slack time corresponding to the model; and predict a standalone execution time corresponding to the model.

For the determining of whether the first layer is scheduled, the one or more processors may be configured to: determine whether the plurality of models may include a model of which a QoS slack time is less than or equal to a standalone execution time; and schedule the first layer in response to determining that the plurality of models does not comprise the model of which the QoS slack time is less than or equal to the standalone execution time.

For the scheduling, the one or more processors may be configured to: determine whether the plurality of models may include a model of which a QoS slack time is less than or equal to a standalone execution time; and schedule, in response to determining that the plurality of models may include the model of which the QoS slack time is less than or equal to the standalone execution time, a second layer of the model.

For the scheduling, the one or more processors may be configured to: explore a predetermined number of layers in an ascending order of the idle time in a state of the accelerator among candidate layers of the plurality of models; and compare differences in idle time between the layers.

For the scheduling, the one or more processors may be configured to schedule, in response to the difference in idle time being greater than a threshold, a first layer of which the idle time is minimum.

For the scheduling, the one or more processors may be configured to schedule, in response to the difference in idle time being less than or equal to a threshold, a layer having a smallest QoS slack time among the layers.

The state of the accelerator may include any one or any combination of any two or more of: usage information of a memory included in the accelerator; a difference between a point in time that a computational resource of the accelerator is last used and a point in time that a memory access resource starts to be used; and a proceeding state of each of the plurality of models.

In another general aspect, an electronic device includes: a scheduler configured to: receive one or more execution requests for a plurality of models executed independently of each other in an accelerator; predict, for each of the plurality of models, quality of service (QoS) information corresponding to the model; and schedule the plurality of models in units of layers of the plurality of models based on, for each of the plurality of models, either one or both of the QoS information and an idle time occurring in response to a candidate layer to be scheduled in the model being executed in the accelerator; and an accelerator configured to execute the plurality of models in units of layers according to the scheduling of the plurality of models.

In another general aspect, a processor-implemented method with scheduling includes: receiving one or more execution requests for a plurality of models executed independently of each other in an accelerator; determining whether the models comprise a model of which a quality of service (QoS) slack time is less than or equal to QoS standalone execution time; and scheduling a layer of the models for execution in an accelerator based on execution idle times of layers of the models and a result of the determining.

The scheduling may include scheduling a layer corresponding to a minimum idle time among the idle times, in response to determining that the models do not comprise the model of which the QoS slack time is less than or equal to the standalone execution.

The scheduling may include scheduling a layer the model of which the QoS slack time is less than or equal to the standalone execution, in response to determining that the models comprise the model.

An idle time of a layer among the idle times may include a sum of an idle time of a memory access resource and an idle time of a computational resource for executing the layer in the accelerator.

Other features and aspects will be apparent from the following detailed description, the drawings, and the claims.

Figure 1A:
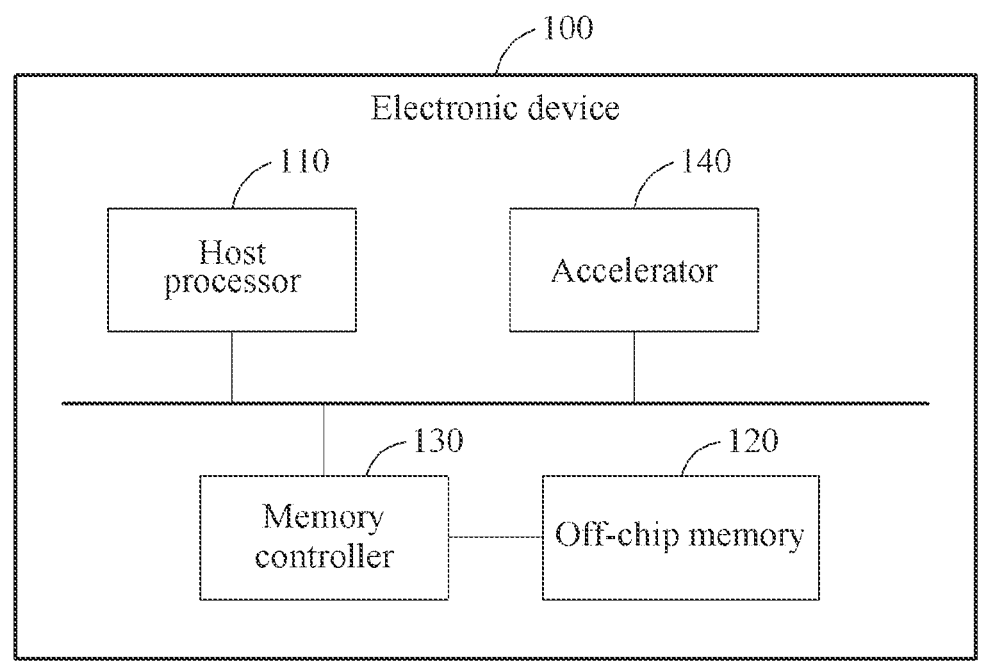
FIGS. 1A and 1B illustrate an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first," "second," and "third" are used to explain various members, components, regions, layers, or sections, these members, components, regions, layers, or sections are not limited by these terms. Rather, these terms should be used only to distinguish one member, component, region, layer, or section from another member, component, region, layer, or section. For example, a "first" member, component, region, layer, or section referred to in the examples described herein may be referred to as a "second" member, component, region, layer, or section without departing from the teachings of the examples.

It will be understood that, throughout the specification, when a component is referred to as being "connected to" or "coupled to" another component, the component can be directly connected or coupled to the other component, or there may be one or more other components intervening therebetween. Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Expressions describing relationships between components, such as "between" and "immediately between" or "neighboring" and "directly neighboring", should be interpreted likewise. As used herein, the term "and/or" includes any one and any combination of any two or more of the associated listed items.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components, and/or combinations thereof, but do not preclude the presence or addition of one or more other features, integers, steps, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which examples belong and after an understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Examples may be, or be implemented as, various types of products such as a data center, a personal computer (PC), a laptop computer, a tablet computer, a smartphone, a television, a smart home device, an intelligent vehicle, a kiosk, and/or a wearable device. Hereinafter, examples will be described in detail with reference to the accompanying drawings, and like reference numerals in the drawings refer to like elements throughout.

Figure 1B:
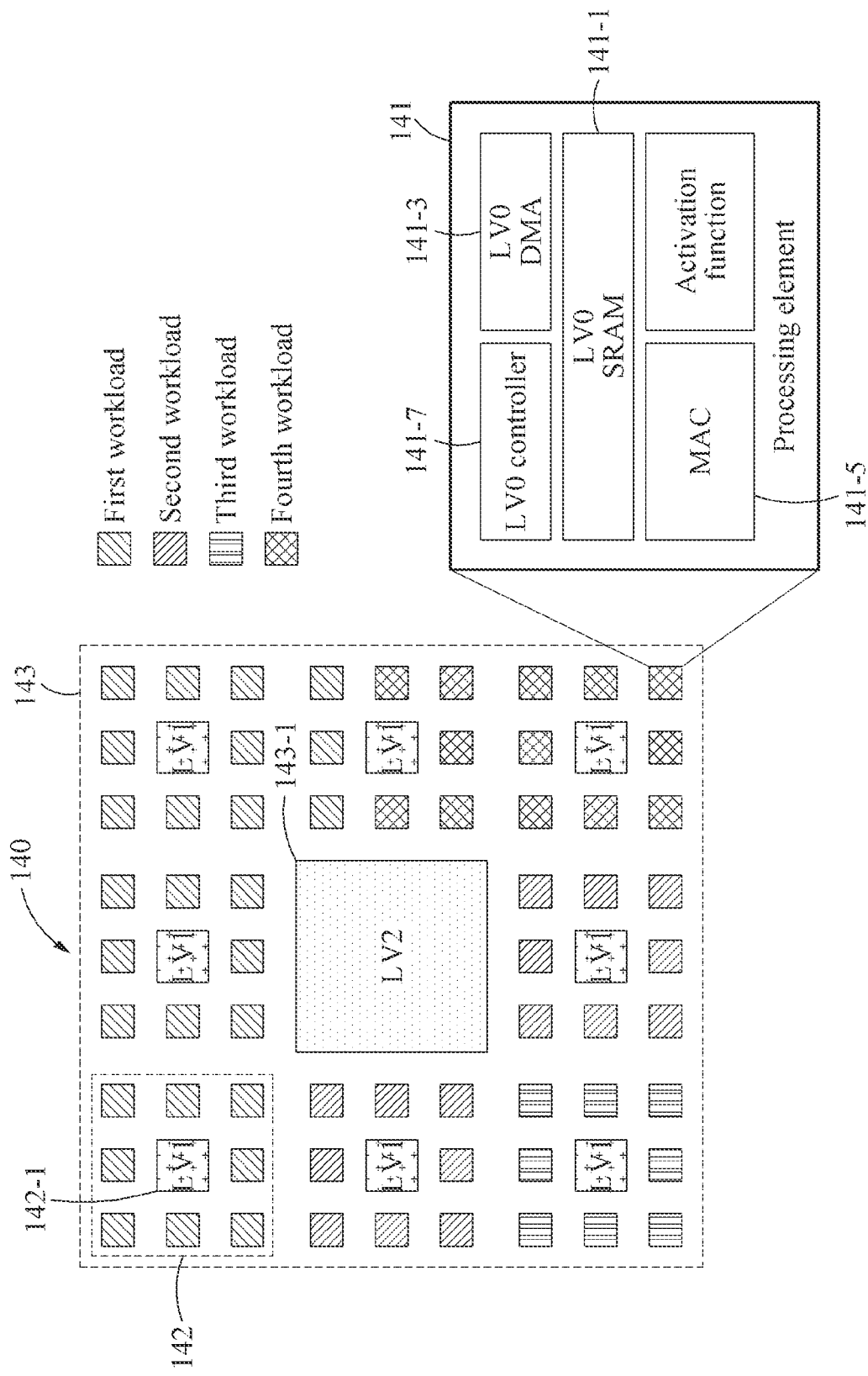

FIGS. 1A and 1B illustrate an example of an electronic device.

Referring to FIG. 1A, an electronic device 100 may include a host processor 110 (e.g., one or more processors), an off-chip memory 120 (e.g., one or more memories), a memory controller 130, and an accelerator 140. The host processor 110, the off-chip memory 120, the memory controller 130, and the accelerator 140 may communicate with one another through any one or any combination of any two or more of a bus, a network on a chip (NoC), a peripheral component interconnect express (PCIe), and/or the like.

The host processor 110 may be a device that controls operations of components included in the electronic device 100, and may be or include, for example, a central processing unit (CPU). The host processor 110 may receive one or more requests for processing a neural network on the accelerator 140, and in response to the requests, generate instructions executable by the accelerator 140. The request may be for data inference based on a neural network and may be for obtaining a data inference result by allowing the accelerator 140 to run the neural network for any one or any combination of any two or more of object recognition, pattern recognition, computer vision, speech recognition, machine translation, machine interpretation, and the like, for example. The host processor 110 may transmit inference target data and parameters of the neural network to the accelerator 140. In addition, the request may also include a request for neural network training. In this case, the host processor 110 may transfer training target data and parameters of the neural network to the accelerator 140.

The off-chip memory 120 may be a memory disposed outside the accelerator 140, and may be or include, for example, a dynamic random-access memory (DRAM) used as a main memory of the electronic device 100. The off-chip memory 120 may store inference target data and/or parameters of a neural network to be executed by the accelerator 140. The stored data may be transferred to the accelerator 140 to perform inference thereafter. Also, the off-chip memory 120 may be utilized when on-chip memory inside the accelerator 140 is insufficient to run the neural network on the accelerator 140.

The off-chip memory 120 may have a larger memory capacity than the on-chip memory inside the accelerator 140. However, when running a neural network, a memory access cost of accessing the off-chip memory 120 by the accelerator 140 may be greater than a memory access cost of accessing an internal on-chip memory. A memory access cost may represent power and/or time used to access a memory and read or write data.

The accelerator 140 may be an artificial intelligence (AI) accelerator that infers input data by executing a neural network according to a command of the host processor 110, and may be a separate processor (e.g., one or more processors) distinct from the host processor 110. For example, the accelerator 140 may be or include any one or any combination of any two or more of a neural processor, a neural processing unit (NPU), a graphics processing unit (GPU), a tensor processing unit (TPU), and a digital signal processor (DSP).

The accelerator 140, being a separate dedicated processor, may process certain tasks more efficiently than the general-purpose processor (for example, the host processor 110) due to the characteristics of operations according to the neural network. For such efficient processing of tasks, one or more processing elements (PEs) and an on-chip memory included in the accelerator 140 may be utilized. The on-chip memory may be a device including a global shared buffer and/or a local buffer included in the accelerator 140 and may be distinguished from the off-chip memory 120 located outside the accelerator 140. For example, the on-chip memory may include a scratchpad memory accessible through an address space, a static random-access memory (SRAM), and/or the like.

The neural network may include a plurality of layers. In an example, the neural network may include an input layer, a plurality of hidden layers, and an output layer. Each layer may include a plurality of nodes. Each node may represent a computational unit having one or more inputs and outputs, and the nodes may be interconnected. Weights may be set for connections between nodes, and the weights may be adjusted or changed. The weight may amplify, decrease, or maintain an associated data value, thereby determining a degree of influence of the corresponding data value on a final result. Weighted inputs of nodes included in a previous layer may be input to nodes included in the output layer. A process in which weighted data is input from a layer to a subsequent layer may be referred to as propagation.

When a plurality of requests is received in the host processor 110, the accelerator 140 may execute a plurality of neural networks according to an instruction transmitted from the host processor 110. In this case, the plurality of neural networks executed in the accelerator 140 may be neural networks having different structures, or the same neural network executed multiple times. When a plurality of neural networks is simply executed on an accelerator according to an order in which requests are received in a host processor, due to the nature of the workload of each neural network, it may be difficult for a typical electronic device to reduce an idle time in which hardware resources of the accelerator are not used in the middle of execution, which may lead to a significant tail-latency in which late received requests are significantly delayed while processing older requests. To prevent such a decrease in the utilization of an accelerator, the electronic device 100 of one or more embodiments may perform scheduling of a plurality of neural networks running on the accelerator 140. For example, the electronic device 100 of one or more embodiments may minimize the idle time occurring in the middle of execution by scheduling the plurality of neural networks in units of layers of the neural networks. For ease and convenience of description, the neural network may also be referred to as a model.

FIG. 1B illustrates an example of the accelerator 140 that executes a scheduled model. The accelerator 140 may include a plurality of processing elements and a multilevel memory accessible by any one or any combination of any two or more of the processing elements. The multilevel memory may include a level 0 memory 141-1, a level 1 memory 142-1, and a level 2 memory 143-1 corresponding to the on-chip memory of the accelerator 140.

A processing element 141, which is one of the plurality of processing elements, may include the level 0 memory 141-1, a level 0 direct memory access controller (DMA) 141-3, a multiplier-accumulator (MAC) 141-5, and a level 0 controller 141-7.

The level 0 memory 141-1 may be a memory accessible to the processing element 141 corresponding to level 0 memory 141-1. For example, the level 0 memory 141-1 may be accessed by only the processing elements 141 among the plurality of processing elements included in the accelerator 140.

The level 0 DMA 141-3 may control input data and/or output data of the level 0 memory 141-1 according to a command of the level 0 controller 141-7. The level 0 DMA 141-3 may read specific data from the level 0 memory 141-1 or write specific data on the level 0 memory 141-1 according to information about a source, a destination, and a data size included in the command from the level 0 controller 141-7.

For example, data input to the level 0 memory 141-1 or output from the level 0 memory 141-1 may be monitored and/or profiled. Such monitoring and/or profiling operations may be performed in the level 0 DMA 141-3 or may be performed in a separate element. Through monitoring and/or profiling, an access cost of the level 0 memory 141-1, usage information of the level 0 memory 141-1, types of data stored in the level 0 memory 141-1, and/or the like may be verified. For example, the level 0 DMA 141-3 may identify what the percentage of the usage information of the level 0 memory 141-1 is and what workload the data stored in the level 0 memory 141-1 relates to.

The MAC 141-5 may perform an operation of workload allocated to the processing element 141. For example, the MAC 141-5 may perform a multiplication and accumulation operation on given data. In addition, the MAC 141-5 may apply an activation function to the given data. The activation function may include, for example, sigmoid, hyperbolic tangent (tanh), rectified linear unit (ReLU), and/or the like.

The level 0 controller 141-7 may be a device (e.g., a processor) that controls components included in the processing element 141, and may control, for example, the level 0 memory 141-1, the level 0 DMA 141-3, and the MAC 141-5.

The foregoing description of the processing element 141 may be similarly applied to each of a plurality of processing elements included in the accelerator 140. For example, the accelerator 140 may include the plurality of processing elements, each configured to independently perform an operation.

In an example, the plurality of processing elements may be clustered into groups, each including n processing elements. Here, n may be a natural number greater than 1 and smaller than a number of processing elements included in the accelerator 140. For example, some or all of the plurality of processing elements included in the accelerator 140 may be clustered, and a non-limiting example of this will be described based on clustered processing elements 142.

The clustered processing elements 142 may share one level 1 memory 142-1. For example, the level 1 memory 142-1 may be accessed by the clustered processing elements 142. For example, even when operations performed by each of a first processing element and a second processing element in the clustered processing elements 142 are different from each other, a portion of data used for the operations may be common. The electronic device 100 of one or more embodiments may increase efficiency of the accelerator 140 by storing the common data in the level 1 memory 142-1 to be shared by the first processing element and the second processing element instead of being stored in the level 0 memory 141-1 of each of the first processing element and the second processing element. In an example of FIG. 1B, each of the processing elements of the clustered processing elements 142 may access the level 1 memory 142-1 adjacent to the corresponding processing element.

A level 1 DMA controlling data input/output of the level 1 memory 142-1 may monitor and/or profile data input to or output from the level 1 memory 142-1. In addition, a level 1 controller may also be provided to control the level 1 memory 142-1 and the level 1 DMA.

Further, all of processing elements 143 of the accelerator 140 may share the level 2 memory 143-1. For example, the level 2 memory 143-1 may be accessed by the plurality of processing elements included in the accelerator 140. For example, the plurality of processing elements included in the accelerator 140 may include processing elements that are not clustered into the same group, but share a portion of data used for an operation to be performed. Even though such processing elements may not share corresponding data through the level 1 memory 142-1, the electronic device 100 of one or more embodiments may increase efficiency of the accelerator 140 by storing the common data in the level 2 memory 143-1 to be efficiently shared by such processing elements. Likewise, a level 2 DMA controlling data input/output of the level 2 memory 143-1 may monitor and/or profile data input to or output from the level 2 memory 143-1. In addition, a level 2 controller controlling the level 2 memory 143-1 and the level 2 DMA may also be provided.

As described above, each processing element 141 may access its own the level 0 memory 141-1, the level 1 memory 142-1 adjacent to the processing element 141, and the level 2 memory 143-1 on the accelerator 140 and may utilize the memories when performing allocated workload. As such, the accelerator 140 may include multilevel memories, and the multilevel memories may be hierarchical. In addition, a DMA and a controller included in the accelerator 140 may also have a hierarchical multilevel.

In an example of FIG. 1B, the plurality of processing elements included in the accelerator 140 may simultaneously perform four workloads. For example, a workload with a large amount of computation may be allocated to be processed by a large number of the processing elements.

Also, a workload with a relatively small amount of computation may be allocated to be processed by a small number of the processing elements.

For ease and convenience of description, FIG. 1B illustrates that 64 processing elements are clustered into groups, each group including eight processing elements such that three level memories are utilized when four workloads are performed. However, this is merely an example, and any number of processing elements, workloads, and levels may be applied without limitation.

Hereinafter, a process of scheduling models will be described with reference to the drawings.

Figure 2:
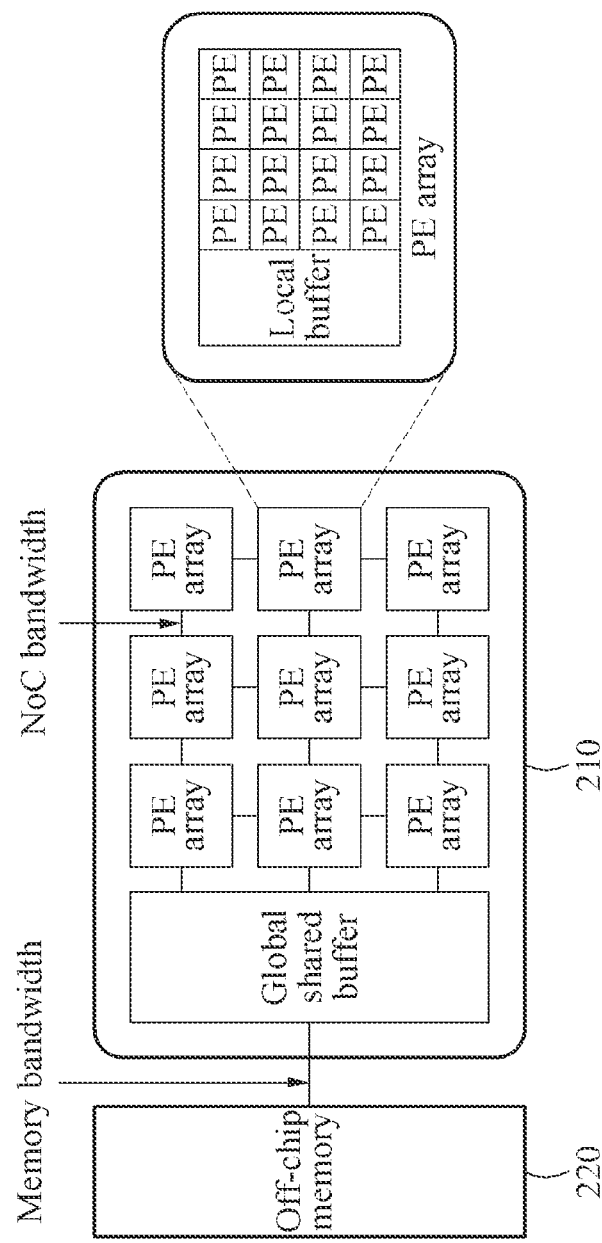
FIG. 2 illustrates an example of a hardware resource of an accelerator.

FIG. 2 illustrates an example of a hardware resource of an accelerator.

FIG. 2 illustrates an accelerator 210 (the accelerator 140 of FIG. 1, as a non-limiting example) and an off-chip memory 220 (the off-chip memory 120 of FIG. 1, as a non-limiting example).

The accelerator 210 may include a global shared buffer and a plurality of processing element (PE) arrays sharing the global shared buffer. Each of the PE arrays may include a local buffer and a plurality of PEs sharing the local buffer. Here, the global shared buffer and the local buffer may be located inside the accelerator 210 and may be referred to as on-chip memory.

For model execution in the accelerator 210, a process of reading data used for model execution through memory access, performing an operation in one or more PEs, and storing a result of the operation in memory may be repetitively performed. Here, the memory may include the off-chip memory 220 in addition to the on-chip memory.

The on-chip memory may be a memory located inside the accelerator 210, and a memory access cost of the on-chip memory is lower than that of the off-chip memory 220. However, because a memory capacity of the on-chip memory is smaller than that of the off-chip memory 220, the on-chip memory alone may not be sufficient to store all data for arithmetic processing in the Pes. In this case, the off-chip memory 220 may be used.

As such, numerous hardware resources may be used to run a model on the accelerator 210. In summary, computational resources based on one or more Pes and memory access resources based on the on-chip memory and/or the off-chip memory 220 may be used.

For example, the computational resource may represent an amount of computational operations to be processed by the PE, and may be expressed in units of floating point operations per second (FLOPS) and tera operations per second (TOPS). The memory access resource represents an NoC bandwidth between the PE arrays and a memory bandwidth between the accelerator 210 and the off-chip memory 220, and may be expressed in units of gigabyte per second (GB/s). In addition, the memory access resource also indicates memory capacities of the global shared buffer and the local buffer, and may be expressed in units of megabyte (MB).

The memory bandwidth may be for moving data stored in the off-chip memory 220 of a relatively high capacity to the global shared buffer of a relatively low capacity in the accelerator 210 for operation. The NoC bandwidth may be for moving the data moved to the global shared buffer to the PE array that performs an actual operation. In general, the memory bandwidth may be smaller than the NoC bandwidth in the accelerator 210.

Models and/or layers included in each of the model may have different workload characteristics. Due to this, the models or the layers may use different computational resources and memory access resources. Accordingly, the electronic device 100 of one or more embodiments may minimize an idle time and improve overall system performance by maximally overlapping the time that resources in the accelerator are utilized through scheduling performed in consideration of the workload characteristics of the models and/or the layers included in each of the model.

In model scheduling, data dependency and availability of the on-chip memory may be taken into consideration.

The data dependency may indicate an order of computations between data intended by a programmer or compiler to achieve a desired result. A plurality of layers included in one model may be sequentially processed according to a predetermined order. However, when there is no data dependency between the plurality of models processed by the accelerator 210, the models may be processed irrespective of the order. For example, a layer included in a first model may be processed, and then a layer subsequent to the layer may be processed. Alternatively, a layer to be subsequently processed may be processed in a second model. As such, a processing order between the first model and the second model may be changed in units of layers.

The availability of the on-chip memory may restrict the processing of the accelerator 210. The on-chip memory may be an internal memory of the accelerator 210, which allows for fast access, but the memory capacity of the on-chip memory may not be sufficient to perform operations in processing elements. As described above, in a case in which the off-chip memory 220 corresponding to an external memory of the accelerator 210 is used, the memory access time is larger than that of the on-chip memory and thus, may be taken into consideration when performing the scheduling. For example, a scheme in which intermediate data of each of the models is reused in the on-chip memory of the accelerator 210 may also affect the memory access cost and thus, may be taken into consideration.

Figure 3:
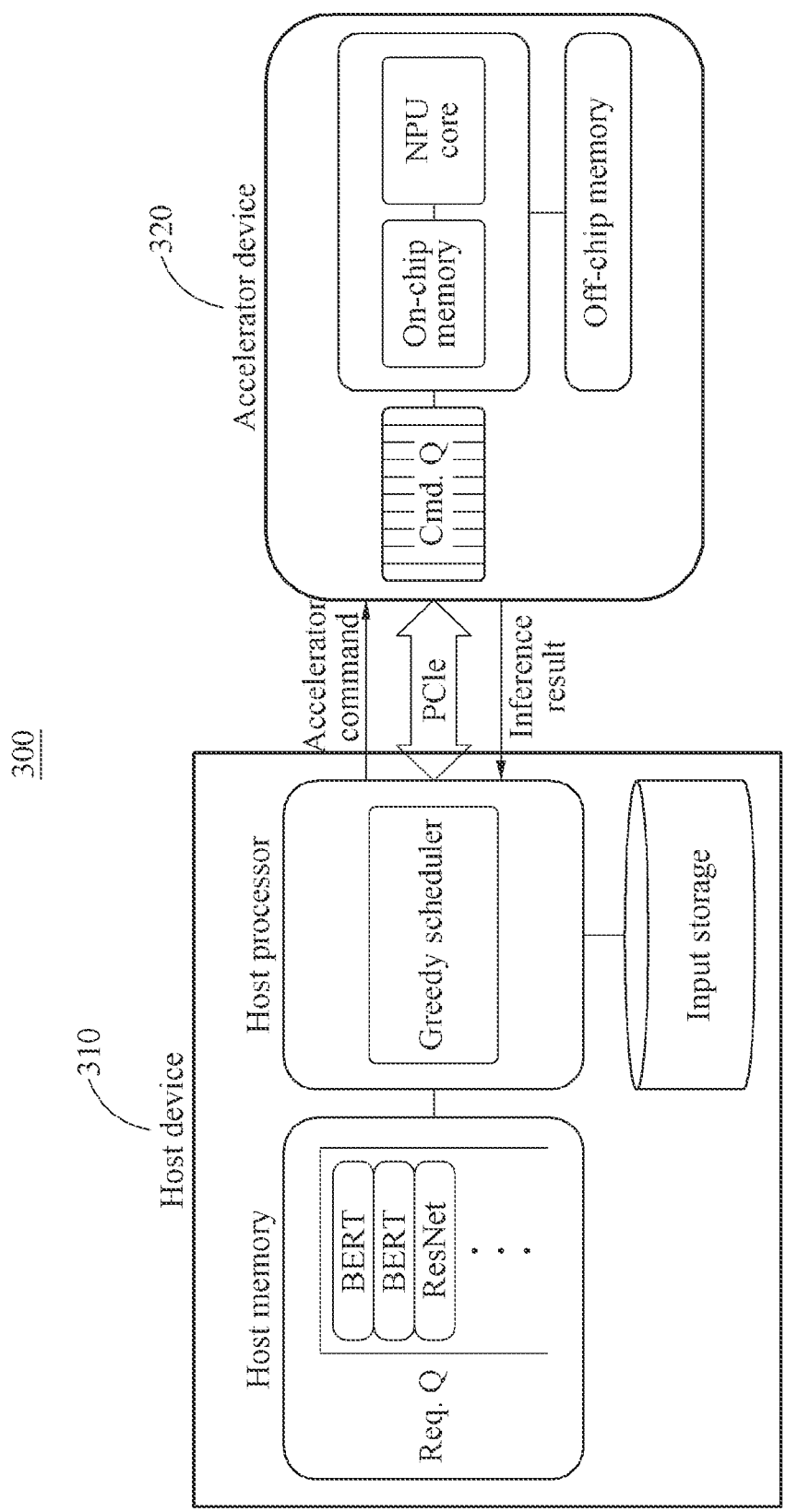
FIG. 3 illustrates an example of an operation of performing scheduling in units of layers in an electronic device.

FIG. 3 illustrates an example of an operation of performing a layer-based scheduling in an electronic device.

Referring to FIG. 3, a host device 310 and an accelerator device 320 included in an electronic device 300 (the electronic device 100 of FIG. 1, as a non-limiting example) may be connected to each other through a PCIe, such that a model is executed in the accelerator device 320 according to scheduling determined in the host device 310. However, the connection between the host device 310 and the accelerator device 320 is not limited to the PCIe, and the description of the present disclosure may apply to other types of connections.

The host device 310 may include a host memory (e.g., one or more memories), a host processor (e.g., one or more processors), and an input storage. The host memory may include a request queue that stores requests from a single user or a plurality of users. The request queue may continuously accumulate execution requests for models supported by the accelerator device 320. BERT, ResNet, and/or the like of FIG. 3 may be models for which execution requests are received from a user.

The host processor may include a scheduler that schedules a layer to be subsequently executed among models corresponding to the requests stored in the request queue.

The scheduler may be called each time that the execution of the layer scheduled in the accelerator device 320 online is completed and, at the corresponding time (e.g., when called), schedule a layer that minimizes an idle time of the accelerator device 320. For example, the scheduler may calculate (e.g., determine) an idle time that occurs when a candidate layer to be scheduled in each of the plurality of models corresponding to user requests available at the time of calling is executed in the accelerator device 320. Through this, the scheduler may schedule a layer having a minimum idle time so as to be executed in the accelerator device 320. When the plurality of models do not have a data dependency therebetween, the scheduler may schedule the models in units of layers independent of a request order.

As such, each time that each layer execution is completed, the scheduler may calculate the idle time of the accelerator device 320 occurring when each candidate layer is selected and schedule a layer having the minimum idle time, thereby maximizing the throughput and performance of the accelerator device 320 even through runtime scheduling based on some layers without considering the execution of all layers included in each model.

When the user requests are scheduled with the goal of maximizing the throughput only without considering a quality of service (QoS) of the user requests, a given user request may still be excessively delayed by the scheduling. In such cases, an excessive amount of user requests may be accumulated, which may lead to an increase of a server load, and a throughput per unit time of the entire service may increase. However, each user request service time (e.g., service latency) may increase, which may lead to a degradation in QoS.

The QoS may indicate an agreed measurement index and goal for a service between a provider and a user in service provision, and may also be referred to as a service level agreement (SLA). Further, the QoS may be defined by a service processing time. For example, a high QoS may indicate that a user request input to a cloud is serviced with a service latency within a predicted range.

The scheduler may perform scheduling by converting throughput-priority scheduling and QoS management-priority scheduling at an appropriate point in time. For this, as described below, the scheduler may predict (e.g., determine) a point in time close to QoS violation and give priority to throughput until immediately before the point in time. When the predicted point in time close to the QoS violation occurs, the scheduler may give priority to the corresponding user request, thereby preventing the QoS violation. The QoS violation may refer to a state in which a quality of service is reduced below a predetermined threshold, and may also be referred to as a QoS failure. For example, the QoS violation may indicate a state in which a user request input to the cloud is delayed more than a predetermined threshold. A non-limiting example operation performed in consideration of the QoS management will be described in greater detail with reference to FIGS. 5 through 7.

In addition, even when the scheduler is called each time that a layer executed on the accelerator device 320 is switched (e.g., content switching), real-time scheduling may be performed, and scalability for multiple models may also be supported.

In an example, the following accelerator state may be tracked and recorded, and the scheduler may perform scheduling using the accelerator state. The accelerator state may include any one or any combination of any two or more of usage information (e.g., a total capacity, used capacity and/or remaining capacity of the on-chip memory; in MB units) of a memory included in the accelerator, a difference (e.g., in cycle units) between a point in time that a computational resource of the accelerator is last used and a point in time that a memory access resource starts to be used, and a proceeding state of each of the plurality of models (e.g., represented by an n-th layer and the like considering that data dependency exists in layers included in the same model).

In addition, the scheduler may calculate a potential possibility that an idle time may occur in the future according to the state of the on-chip memory, such that scheduling is performed in consideration of an effect of a current layer selection on future layer scheduling.

The scheduler may perform the above-described scheduling until the execution of all models stored in the request queue is completed.

The input storage may include a model parameter for model execution and input data to be inferred.

The host device 310 may transmit an accelerator command for a layer to be executed at a point in time determined by the scheduler to the accelerator device 320. The host device 310 may transmit the accelerator command for the layer to be executed at the point in time determined by the scheduler to the scheduler. The accelerator device 320 may execute the layer according to the accelerator command, and may return an inference result of a model on which the layer execution is completed to the host device 310.

Through the above-described method, the electronic device 300 of one or more embodiments may effectively implement a runtime scheduler without adding additional dedicated hardware or auxiliary hardware for performing runtime scheduling in units of layers.

Figure 4A:
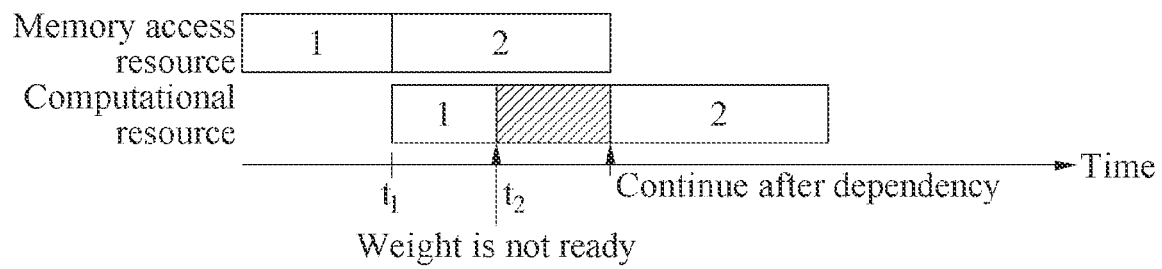
FIGS. 4A and 4B illustrate an example of an idle time.
Figure 4B:
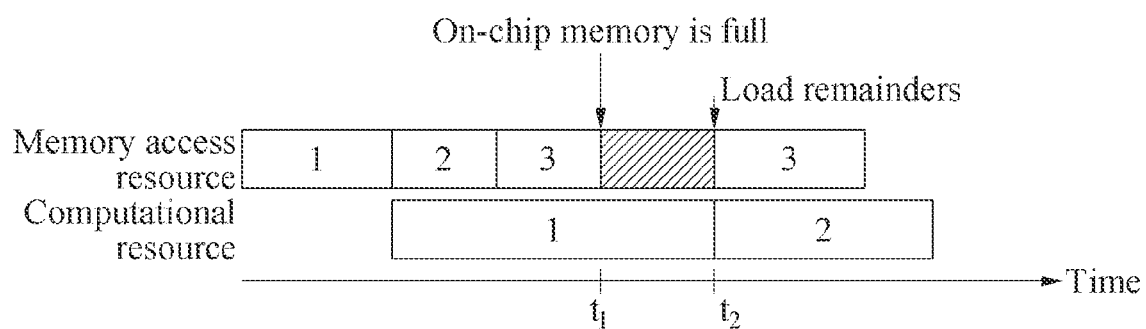

FIGS. 4A and 4B illustrate an example of an idle time.

Prior to describing a scheduling operation performed in consideration of a QoS management, a method of performing scheduling by giving priority to a throughput will be described with reference to FIGS. 4A and 4B. Though, the method may further be performed in consideration of the QoS management, according to non-limiting examples.

In order to perform an operation on a computational resource, a process of reading operation target data through a memory access resource may be preceded. In addition, when the memory access resource and the computational resource operate in parallel, data for the next operation may be read in advance through the memory access resource while the computational operation is performed on the computational resource. Through this, when the current computational operation is completed in the computational resource, the next computational operation is subsequently performed (e.g., without incurring an unnecessary idle time due to data for the next operation being read only once the current computational operation is completed), thereby reducing an unnecessary idle time. As the idle time of the memory access resource and the computational resource is reduced, a utilization rate of the accelerator may be improved, such that high performance is achieved.

FIG. 4A illustrates an example for explaining an idle time of a computational resource. In an example of FIG. 4A, "1" represents a first layer scheduled, which is a previous layer that is most recently scheduled. Also, "2" represents a second layer to be subsequently executed after the first layer is executed, and may be a candidate layer to be scheduled.

In an example of FIG. 4A, when data of the first layer is loaded through the memory access resource, an operation on the first layer may be performed in the computation resource, and a memory access to the second layer to be subsequently executed in the memory access resource may be started. At this time, when a memory access time for the second layer is longer than an operation time for the first layer, the memory access to the second layer may not be completed and a model parameter for an operation on the second layer may be insufficiently prepared. Thus, even when the operation on the first layer is terminated in the computation resource, the operation on the second layer may not be subsequently performed without idle, and an idle time may occur until the memory access of the second layer is completed. In summary, the idle time of the computational resource may occur when the execution time of a memory access to the candidate layer to be scheduled is longer than the execution time of the computational resource for the most recently scheduled previous layer.

In an example, the scheduler may determine the idle time of the computational resource based on a difference between a point in time t2 at which the computational resource is last executed (e.g., is completed) and a point in time t1 at which the memory access resource is last executed for the previous layer and an execution time of the memory access resource for the candidate layer to be scheduled. For example, the scheduler may calculate the idle time of the computational resource by subtracting the difference between the point in time t1 and the point in time t2 from the execution time of the memory access resource for the candidate layer.

FIG. 4B illustrates an example for explaining an idle time of a memory access resource. In an example of FIG. 4B, "1" represents a first layer scheduled. "2" represents a second layer scheduled, which is a previous layer that is most recently scheduled. "3" represents a third layer to be subsequently executed after the second layer is executed, and may be a candidate layer to be scheduled.

In an example of FIG. 4B, when data of the first layer is loaded through the memory access resource, an operation on the first layer may be performed in the computation resource, and then the memory access resource may perform data loading for the second layer. However, due to a limited capacity of the on-chip memory, the memory access resource may perform data loading of subsequent layers only with a free capacity of the on-chip memory. When an operation time for the first layer is longer than an execution time of the memory access resource for subsequent layers (e.g., the second layer and the third layer, etc.), when a point in time t1 at which the on-chip memory is full and no more data loading is possible comes, an idle time of the memory access resource may occur. When an operation on the first layer is completed in the computational resource (at a point time t2 of FIG. 4B), data related to the operation on the first layer may be removed from the memory access resource, and suspended execution of the memory access resource may be resumed.

The scheduler may determine the idle time of the memory access resource based on the point in time t1 at which the execution of the memory access resource for the candidate layer to be scheduled is suspended due to the limitation on the capacity of the on-chip memory of the accelerator and the point in time t2 at which execution of the most recently scheduled previous layer is completed in the computational resource. For example, the scheduler may calculate a difference between the point in time t1 and the point in time t2 as the idle time of the memory access resource. In addition, when calculating the idle time of the memory access resource, the scheduler may take the above-described accelerator state into consideration.

The scheduler may schedule a layer of which a sum of an idle time of the memory access resource and an idle time of the computational resource is minimized, among candidate layers to be scheduled in each of a plurality of models. When there are a plurality of candidate layers having the same sum of an idle time of the memory access resource and an idle time of the computational resource, the scheduler may schedule a layer having a minimum idle time of the memory access resource. For example, a layer in which a difference between a point in time that a computational resource of the accelerator is last used and a point in time that a memory access resource starts to be used is maintained at a similar level to the idle time of the memory access resource that occurs due to the on-chip memory may be scheduled. Through this, the scheduler of one or more embodiments may minimize the idle time that may occur in the subsequent scheduling.

Figure 5:
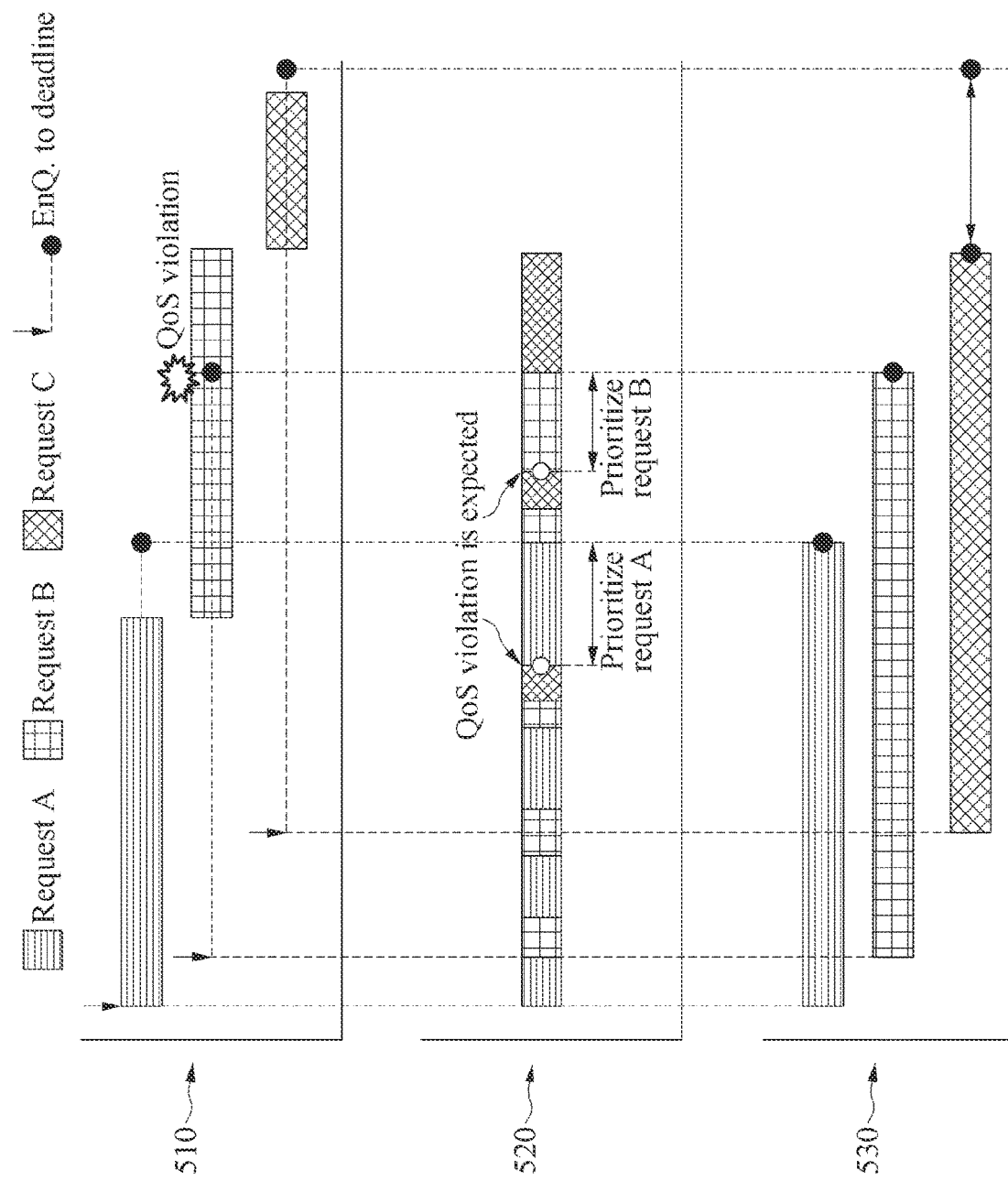
FIG. 5 illustrates an example of a method of operating a scheduler.

FIG. 5 illustrates an example of a method of operating a scheduler.

Referring to FIG. 5, a scheduler may schedule a plurality of models based on either one or both of QoS information and an idle time occurring when a candidate layer to be scheduled in an accelerator in each of the plurality of models is executed. For example, the scheduler may predict a point in time close to QoS violation and give priority to a throughput until immediately before the point in time. Then, when the point in time close to the QoS violation occurs, the scheduler may give priority to the corresponding user request, thereby preventing the QoS violation. To effectively implement the prediction and transition scheme, a process of accurately predicting the point in time close to the QoS violation may be preceded.

To accurately predict the point in time close to the QoS violation, the scheduler may predict a standalone execution time corresponding to each of the plurality of models and a QoS slack time corresponding to each of the plurality of models. Here, the standalone execution time and the QoS slack time may be respectively expressed by Equations 1 and 2 as shown below, for example.

$$\text{Standalone Execution Time} = \sum_{i=C\ldots L} \max(\text{memory time}_i, \text{compute time}_i) \quad \text{Equation 1}$$

$$\text{QoS Slack Time} = \text{Enqueue Time} + \text{QoS Constraint} - \text{Current Time} \quad \text{Equation 2}$$

In Equation 1, C denotes a current execution index of a corresponding DNN model, L denotes a last execution index, and memory time and compute time denote a memory access resource and a computational resource, respectively.

In Equation 2, Enqueue Time denotes a timestamp of a point in time at which a user request enters a service queue, Current Time denotes a last timestamp of a point in time at which the current scheduler is called, and QoS constraint denotes an expected constraint time from a point in time that the corresponding service request is input to a system to an execution.

The scheduler may determine whether a model of which the QoS slack time is less than or equal to the standalone execution time is present. When the QoS slack time is greater than the standalone execution time, a free capacity for executing another layer may still remain. When the QoS slack time is less than or equal to the standalone execution time, another layer may no longer be scheduled, and it may be determined that the QoS violation of the model is imminent.

Referring to FIG. 5, "A" of Request A represents a first neural network model that is executed according to a service request received first. "B" of Request B represents a second neural network model that is executed according to a service request received second. "C" of Request C represents a third neural network model that is executed according to a service request received third.

A graph 510 of FIG. 5 relates to an example of scheduling a user request with the goal of maximizing throughput only, without considering a QoS of the user request. Referring to the graph 510, each user request is sequentially executed in one accelerator device (e.g., NPU). At this time, in "B" and "C" coming later than "A", a QoS violation may occur due to a latency caused by "A." In summary, when a user request is scheduled with the goal of maximizing throughput only, a single user request may be excessively delayed by the scheduling.

A graph 520 relates to an example of a method of performing scheduling in consideration of a QoS of a user request. Referring to the graph 520, by preferentially scheduling a corresponding request each time that the QoS violation is predicted, the scheduler of one or more embodiments may effectively manage a high quality of service and a maximum latency of the user request.

For example, the scheduler may calculate a QoS slack time and a QoS standalone time of "A", predict a point in time that the QoS slack time is less than a standalone execution time, and perform an operation by giving priority to throughput until immediately before the point in time. When the predicted point in time occurs, the scheduler may perform an operation on "A", thereby preventing the QoS violation of "A." Likewise, thereafter, the scheduler may calculate a QoS slack time and a QoS standalone time of "B", predict a point in time that the QoS slack time is less than a standalone execution time, and perform an operation by giving priority to throughput until immediately before the point in time. When the predicted point in time comes, the scheduler may perform an operation on "B", thereby preventing the QoS violation of "B."

Referring to a graph 530, it can be known that when scheduling is performed in consideration of a QoS of a user request, higher quality of service and maximum delay time of the user request may be effectively managed as compared to when scheduling is performed without considering the QoS.

Figure 6:
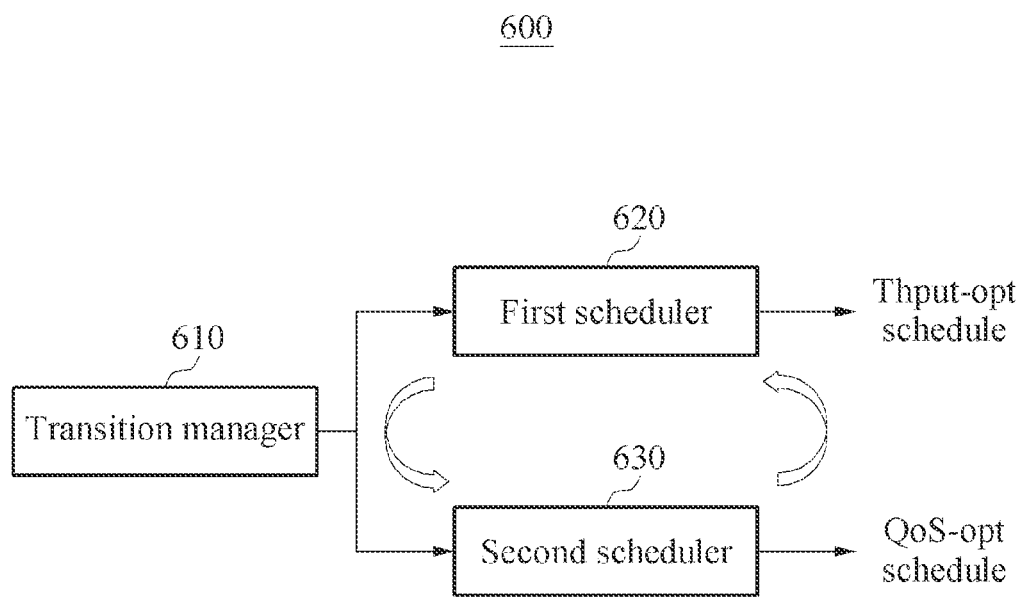
FIG. 6 is a block diagram illustrating an example of a scheduler.

FIG. 6 is a block diagram illustrating an example of a scheduler.

Referring to FIG. 6, a scheduler 600 may include a transition manager 610, a first scheduler 620, and a second scheduler 630.

A user request may be sent and accumulated in a user request queue of a host processor. The host processor may transmit a predetermined number of user requests among the most recently received user requests to the scheduler 600.

The transition manager 610 may predict QoS slack time and QoS standalone execution time of models respectively corresponding to the received user requests. Further, the transition manager 610 may run the first scheduler 620 and the second scheduler 630 while switching therebetween.

The first scheduler 620 may be a scheduler that gives priority to a throughput. The second scheduler 630 may be a scheduler that performs scheduling by giving priority to QoS management.

For example, among candidate layers to be scheduled in each of a plurality of models, the first scheduler 620 may schedule a layer of which a sum of an idle time of a memory access resource and an idle time of a computational resource is minimized. The second scheduler 630 may determine whether the plurality of models includes a model of which a QoS slack time is less than or equal to a standalone execution time. When the corresponding model is present, the second scheduler 630 may schedule a layer of the corresponding model.

As such, until the second scheduler 630 determines that a model of which a QoS slack time is less than or equal to a standalone execution time is present, scheduling may be performed based on the first scheduler 620. After that, the transition manager 610 may switch the first scheduler 620 to the second scheduler 630 such that the second scheduler 630 schedules the corresponding model. Further, when an operation on the corresponding model is completed, the transition manager 610 may switch the second scheduler 630 to the first scheduler 620.

Figure 7:
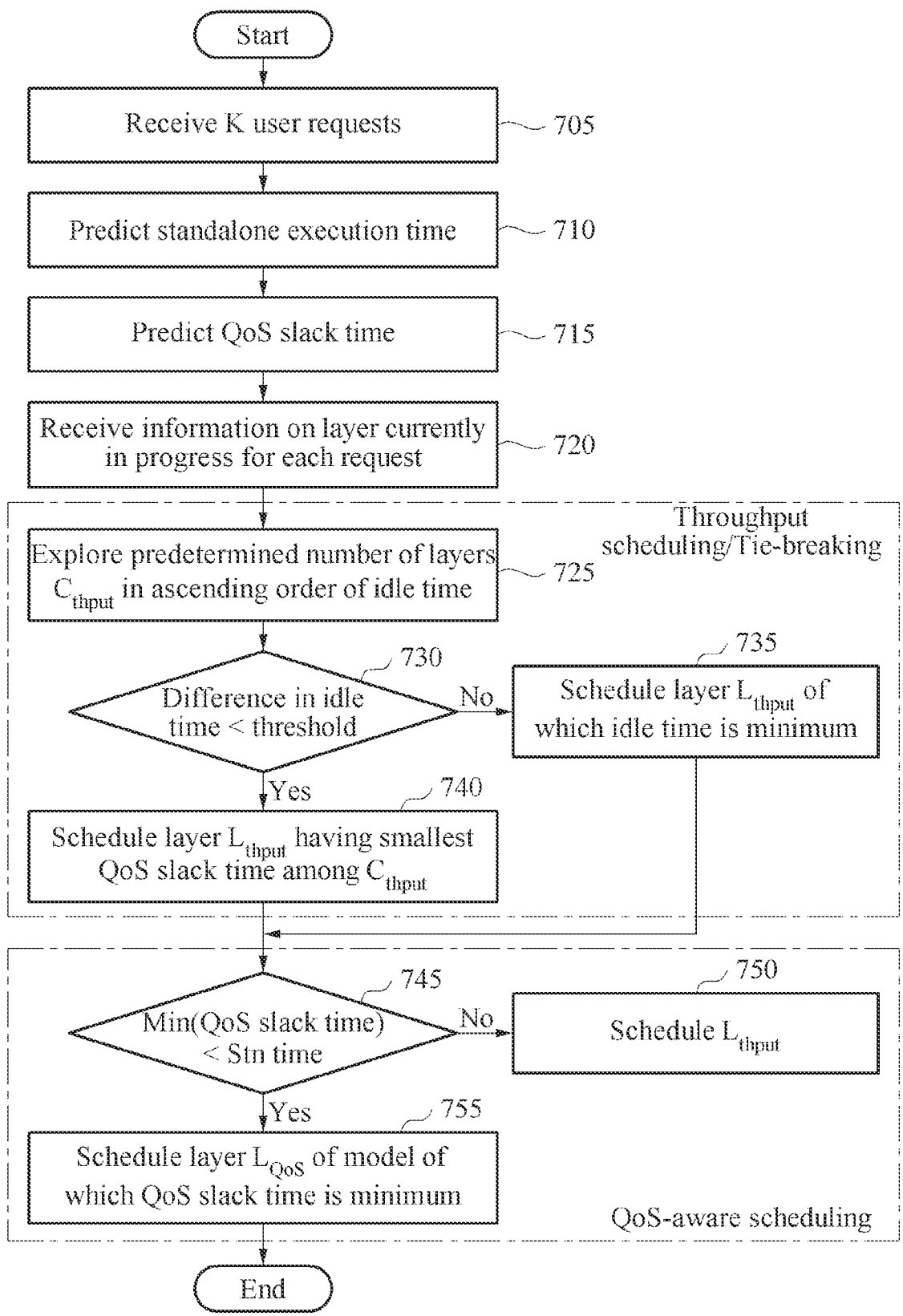
FIG. 7 is a flowchart illustrating an example of a method of operating a scheduler that determines a model to be executed in an accelerator.

FIG. 7 is a flowchart illustrating an example of a method of operating a scheduler that determines a model to be executed in an accelerator.

Operations of FIG. 7 may be performed in the order and manner shown, and the order of some operations may be changed or some operations may be omitted without departing from the spirit and scope of the illustrated examples. Operations of FIG. 7 may be performed in parallel or simultaneously.

Referring to FIG. 7, in operation 705, a scheduler may receive one or more execution requests to a plurality of models executed independently of each other in an accelerator.

In operation 710, the scheduler may predict a standalone execution time corresponding to each of the plurality of models.

In operation 715, the scheduler may predict a QoS slack time corresponding to each of the plurality of models. The QoS information may include the standalone execution time and a QoS slack time.

In operation 720, the scheduler may receive information on a layer currently in progress for each request. For example, the scheduler may receive information on a layer of a model on which an operation is currently performed in an accelerator device.

Among candidate layers to be scheduled in each of the plurality of models, the scheduler may schedule a layer of which a sum of an idle time of a memory access resource and an idle time of a computational resource is minimized.

Further, when priorities of candidate layers are tie-breaking (e.g., the difference between the idle time sum of one candidate layer and the idle time sum of another candidate layer is less than or equal to a threshold), the scheduler may select a layer having a smallest QoS slack time from the candidate layers.

In operation 725, the scheduler may explore a predetermined number of layers in an ascending order of the idle time in a state of the accelerator among candidate layers of the plurality of models.

Further, in operation 730, the scheduler may compare differences in idle time between the layers.

In operation 735, based on a determination that the difference in idle time is greater than a threshold, the scheduler may schedule a layer of which the idle time is minimum. In contrast, in operation 740, based on a determination that the difference in idle time is less than or equal to the threshold, the scheduler may schedule a layer having a smallest QoS slack time among the layers.

In operation 745, the scheduler may determine whether the plurality of models includes a model of which a QoS slack time is less than or equal to a standalone execution time.

In operation 750, based on a determination that the model of which the QoS slack time is less than or equal to the standalone execution time is absent, the scheduler may schedule the layer determined in operation 735 or 740.

In contrast, in operation 755, based on a determination that the model of which the QoS slack time is less than or equal to the standalone execution time is present, the scheduler may schedule a layer of the corresponding model and prevent a QoS violation.

Figure 8:
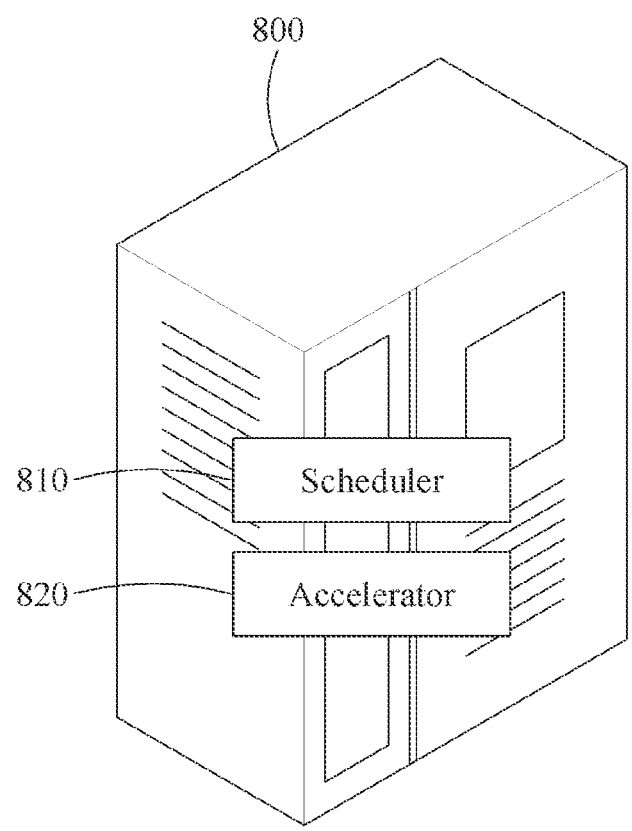
FIGS. 8 and 9 illustrate examples of an electronic device.
Figure 9:
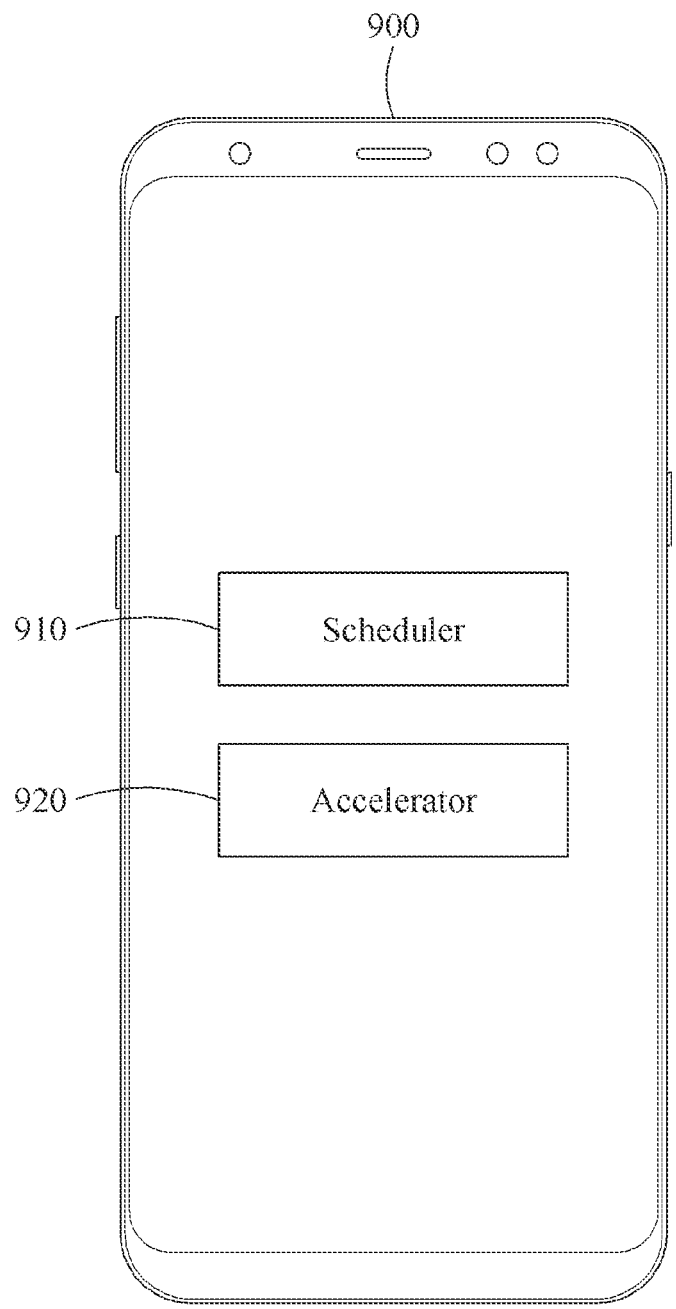

FIGS. 8 and 9 illustrate examples of an electronic device.

Referring to FIG. 8, an electronic device may be implemented as a server 800. The server 800 may include a scheduler 810 and an accelerator 820. The scheduler 810 may be any of the schedulers described herein with reference to FIGS. 1-7 (the scheduler 600 of FIG. 6, as a non-limiting example), and the accelerator 820 may be any of the accelerators described herein with reference to FIGS. 1-7 (the accelerator 140 of FIG. 1, as a non-limiting example).

The server 800 is a separate device distinguished from a user terminal controlled by a user, and may communicate with one or more user terminals through a wired and/or wireless network. The server 800 may receive requests simultaneously transmitted by multiple users through their own terminals. The server 800 may schedule models to be executed in the accelerator 820 in units of a layer through the scheduler 810 as described above. The accelerator 820 may determine inference results by executing a plurality of models according to the scheduling. In addition, the server 800 may return the inference results to the corresponding user terminals, respectively. For example, the user terminal may include various computing devices such as a smartphone, a personal computer (PC), a tablet PC, and a laptop computer, various wearable devices such as a smart watch and smart glasses, various home appliances such as a smart speaker, a smart TV, and a smart refrigerator, a smart car, a smart kiosk, and an Internet of Things (IoT) device.

Referring to FIG. 9, an electronic device may be implemented as a user terminal 900. The user terminal 900 may include a scheduler 910 and an accelerator 920. The scheduler 910 may be any of the schedulers described herein with reference to FIGS. 1-8 (the scheduler 600 of FIG. 6, as a non-limiting example), and the accelerator 920 may be any of the accelerators described herein with reference to FIGS. 1-8 (the accelerator 140 of FIG. 1, as a non-limiting example).

In FIG. 9, the user terminal 900 is illustrated as a smartphone for convenience of explanation, but any device controlled by a user may be applied without limitation. The user terminal 900 may directly obtain requests from a user, and schedule models to be executed on the accelerator 920 through the scheduler 99 described above. The accelerator 920 may determine inference results by executing a plurality of models according to the scheduling.

The electronic devices, host processors, off-chip memories, memory controllers, accelerators, processing elements, level 0 memories, level 0 DMAs, MACs, level 0 controllers, clustered processing elements, level 1 memories, level 2 memories, host devices, accelerator devices, schedulers, transition managers, first schedulers, second schedulers, servers, user terminals, electronic device 100, host processor 110, off-chip memory 120, memory controller 130, accelerator 140, processing element 141, level 0 memory 141-1, level 0 DMA 141-3, multiplier-accumulator (MAC) 141-5, level 0 controller 141-7, clustered processing elements 142, level 1 memory 142-1, processing elements 143, level 2 memory 143-1, accelerator 210, off-chip memory 220, host device 310, accelerator device 320, scheduler 600, transition manager 610, first scheduler 620, second scheduler 630, server 800, scheduler 810, accelerator 820, user terminal 900, scheduler 910, accelerator 920, and other apparatuses, units, modules, devices, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, bD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with scheduling, the method comprising:
   receiving one or more execution requests for a plurality of models executed independently of each other in an accelerator;
   predicting, for each of the plurality of models, quality of service (QoS) information corresponding to the model; and scheduling the plurality of models in units of layers of the plurality of models based on, for each of the plurality of models, the QoS information and an idle time occurring in response to a candidate layer to be scheduled in the model being executed in the accelerator,
   wherein the scheduling comprises: determining whether the plurality of models comprises a model of which a QoS slack time is less than or equal to a standalone execution time; and scheduling, in response to determining that the plurality of models comprises the model of which the QoS slack time is less than or equal to the standalone execution time, a second layer of the model;
   wherein the scheduling comprises, based on the QoS information, switching between scheduling based on the idle time and scheduling based the QoS information.

2. The method of claim 1, wherein the scheduling comprises:
   exploring a first layer of which the idle time is minimum in a state of the accelerator among candidate layers of the plurality of models; and
   determining whether the first layer is scheduled based on the QoS information corresponding to each of the plurality of models.

3. The method of claim 1, wherein the predicting of the QoS information comprises:
   predicting a QoS slack time corresponding to the model; and
   predicting a standalone execution time corresponding to the model.

4. The method of claim 2, wherein the determining of whether the first layer is scheduled comprises:
   determining whether the plurality of models comprises a model of which a QoS slack time is less than or equal to a standalone execution time; and
   scheduling the first layer in response to determining that the plurality of models does not comprise the model of which the QoS slack time is less than or equal to the standalone execution time.

5. The method of claim 1, wherein the scheduling comprises:
   exploring a predetermined number of layers in an ascending order of the idle time in a state of the accelerator among candidate layers of the plurality of models; and
   comparing differences in idle time between the layers.

6. The method of claim 5, wherein the scheduling comprises scheduling, in response to the difference in idle time being greater than a threshold, a first layer of which the idle time is minimum.

7. The method of claim 5, wherein the scheduling comprises scheduling, in response to the difference in idle time being less than or equal to a threshold, a layer having a smallest QoS slack time among the layers.

8. The method of claim 2, wherein the state of the accelerator comprises any one or any combination of any two or more of:
   usage information of a memory included in the accelerator;
   a difference between a point in time that a computational resource of the accelerator is last used and a point in time that a memory access resource starts to be used; and
   a proceeding state of each of the plurality of models.

9. A non-transitory computer-readable storage medium storing instructions that, when executed by one or more processors, configure the one or more processors to perform the method of claim 1.

10. An apparatus with scheduling, the apparatus comprising: one or more processors configured to:
   receive one or more execution requests for a plurality of models executed independently of each other in an accelerator;
   predict, for each of the plurality of models, quality of service (QOS) information corresponding to the model; and schedule the plurality of models in units of layers of the plurality of models based on, for each of the plurality of models, the QoS information and an idle time occurring in response to a candidate layer to be scheduled in the model being executed in the accelerator,
   wherein the scheduling comprises: determining whether the plurality of models comprises a model of which a QoS slack time is less than or equal to a standalone execution time; and scheduling, in response to determining that the plurality of models comprises the model of which the QoS slack time is less than or equal to the standalone execution time, a second layer of the model;
   wherein the scheduling comprises, the one or more processors configured to, based on the QoS information, switch between scheduling based on the idle time and scheduling based the QoS information.

11. The apparatus of claim 10, wherein, for the scheduling, the one or more processors are configured to:
   explore a first layer of which the idle time is minimum in a state of the accelerator among candidate layers of the plurality of models; and
   determine whether the first layer is scheduled based on the QoS information corresponding to each of the plurality of models.

12. The apparatus of claim 10, wherein, for the predicting of the QoS information, the one or more processors are configured to:
   predict a QoS slack time corresponding to the model; and
   predict a standalone execution time corresponding to the model.

13. The apparatus of claim 11, wherein, for the determining of whether the first layer is scheduled, the one or more processors are configured to:
   determine whether the plurality of models comprises a model of which a QoS slack time is less than or equal to a standalone execution time; and
   schedule the first layer in response to determining that the plurality of models does not comprise the model of which the QoS slack time is less than or equal to the standalone execution time.

14. The apparatus of claim 10, wherein, for the scheduling, the one or more processors are configured to:
   explore a predetermined number of layers in an ascending order of the idle time in a state of the accelerator among candidate layers of the plurality of models; and
   compare differences in idle time between the layers.

15. The apparatus of claim 14, wherein, for the scheduling, the one or more processors are configured to schedule, in response to the difference in idle time being greater than a threshold, a first layer of which the idle time is minimum.

16. The apparatus of claim 14, wherein, for the scheduling, the one or more processors are configured to schedule, in response to the difference in idle time being less than or equal to a threshold, a layer having a smallest QoS slack time among the layers.

17. The apparatus of claim 11, wherein the state of the accelerator comprises any one or any combination of any two or more of:
   usage information of a memory included in the accelerator;
   a difference between a point in time that a computational resource of the accelerator is last used and a point in time that a memory access resource starts to be used; and
   a proceeding state of each of the plurality of models.

18. An electronic device comprising: one or more processors configured to:
   receive one or more execution requests for a plurality of models executed independently of each other in an accelerator;
   predict, for each of the plurality of models, quality of service (QoS) information corresponding to the model; and schedule the plurality of models in units of layers of the plurality of models based on, for each of the plurality of models, the QoS information and an idle time occurring in response to a candidate layer to be scheduled in the model being executed in the accelerator,
   wherein the scheduling comprises: determining whether the plurality of models comprises a model of which a QoS slack time is less than or equal to a standalone execution time; and scheduling, in response to determining that the plurality of models comprises the model of which the QoS slack time is less than or equal to the standalone execution time, a second layer of the model;
   wherein the scheduling comprises, the one or more processors configured to, based on the QoS information, switch between scheduling based on the idle time and scheduling based the QoS information.

19. A processor-implemented method with scheduling, the method comprising:
   receiving one or more execution requests for a plurality of models executed independently of each other in an accelerator;
   determining whether the models comprise a model of which a quality of service (QOS) slack time is less than or equal to QoS standalone execution time; and
   scheduling a layer of the models for execution in an accelerator based on execution idle times of layers of the models and a result of the determining.

20. The method of claim 19, wherein the scheduling comprises scheduling a layer corresponding to a minimum idle time among the idle times, in response to determining that the models do not comprise the model of which the QoS slack time is less than or equal to the standalone execution.

21. The method of claim 19, wherein the scheduling comprises scheduling a layer the model of which the QoS slack time is less than or equal to the standalone execution, in response to determining that the models comprise the model.

22. The method of claim 19, when an idle time of a layer among the idle times comprises a sum of an idle time of a memory access resource and an idle time of a computational resource for executing the layer in the accelerator.

* * * * *